US006925414B2

(12) United States Patent
Brost et al.

(10) Patent No.: US 6,925,414 B2
(45) Date of Patent: Aug. 2, 2005

(54) APPARATUS AND METHOD OF MEASURING FEATURES OF AN ARTICLE

(75) Inventors: Randolph C. Brost, Albuquerque, NM (US); David R. Strip, Albuquerque, NM (US); Randall H. Wilson, Albuquerque, NM (US)

(73) Assignee: Eastman Kodak Company, Rochester, NY (US)

( * ) Notice: Subject to any disclaimer, the term of this patent is extended or adjusted under 35 U.S.C. 154(b) by 145 days.

(21) Appl. No.: 10/388,787

(22) Filed: Mar. 14, 2003

(65) Prior Publication Data

US 2004/0181362 A1 Sep. 16, 2004

(51) Int. Cl.[7] .................................................. G03C 5/00
(52) U.S. Cl. ...................... 702/168; 250/492.1; 430/30; 356/302
(58) Field of Search .......................... 702/168; 250/548, 250/491.1, 492.1, 492.2, 493.1, 491; 430/30, 311, 394; 356/302

(56) References Cited

U.S. PATENT DOCUMENTS

| | | | | |
|---|---|---|---|---|
| 5,124,927 A | * | 6/1992 | Hopewell et al. ........... 700/121 |
| 5,276,337 A | * | 1/1994 | Starikov ..................... 250/548 |
| 5,345,086 A | * | 9/1994 | Bertram .................... 250/491.1 |
| 5,362,585 A | * | 11/1994 | Adams ......................... 430/30 |
| 5,968,693 A | * | 10/1999 | Adams ......................... 430/30 |
| 6,407,396 B1 | | 6/2002 | Mih et al. | |

* cited by examiner

Primary Examiner—John Barlow
Assistant Examiner—Hien Vo
(74) Attorney, Agent, or Firm—William R. Zimmerli

(57) ABSTRACT

An apparatus and method of measuring an article is provided. The method includes providing an article having a feature to be measured, the article having a surface; measuring the surface of the article with a measuring instrument to obtain article surface data; and analyzing the article surface feature data such that data on the feature to be measured is developed. Measuring the surface of the article can include scanning the measuring instrument over the article surface. Analyzing the article surface feature data can include associating portions of the article surface data with individual features thereby producing associated feature surface data; and analyzing the associated feature surface data. The measuring instrument can be, for example, a contact measuring instrument or an interference measuring instrument. A computer storage medium having instructions stored therein for causing a computer to perform the method described above is also provided.

34 Claims, 12 Drawing Sheets

APPARATUS AND METHOD OF MEASURING FEATURES OF AN ARTICLE

FIELD OF THE INVENTION

This invention relates generally to measuring surfaces and, more particularly, to measuring surfaces having an array of features at least partially located thereon or therein.

BACKGROUND OF THE INVENTION

Conventional measurement of article surfaces can be accomplished using various methods, for example, interferometry and profilometry. Interferometry is performed by projecting a coherent light source on the article surface to be measured, the shape of the light source wave front matching a nominal surface shape. When the light is reflected off the article surface and perceived by a detector, deviations between the actual surface and the nominal shape result in interference patterns in the reflected light. These deviations can be analyzed to determine surface errors.

Interferometry is advantaged because it can make very precise measurements (including fractions of the wavelength of the light used during measuring). However, interferometry is disadvantaged because the projected light must have a shape that matches the nominal surface shape while the article surface to be measured must closely approximate the nominal surface shape. This can be accomplished when measuring spherical feature surfaces and can be accomplished when measuring simple aspheric surfaces by employing special optics which produce an aspheric wave front. However, complicated surface features, for example, those comprising multiple sub-features, can not be measured using conventional interferometry.

Profilometry is performed by tracing a probe across an article surface and measuring the position of the probe while it maintains contact with the surface. Originally invented for the measurement of surface texture, conventional profilometers can collect data with sufficient precision to reconstruct a description of the article surface. Traditional profilometers move the probe in a straight line across the surface, collecting a series of points (x, z) measured along the line. This collection of points (x, z) represents a cross-section of the surface shape. Conventional scanning profilometers extend the traditional profilometer ability to gather data by allowing the probe to travel along more complicated paths, for example, raster scans that sample a series of parallel lines on the surface, "cross hair" scans of intersecting perpendicular lines, concentric circles, etc. Scanning profilometers also collect a series of points (x, y, z) that represent a sampling of points taken on the article surface.

Conventional traditional and scanning profilometers can be equipped with controllers that drive the profilometer to follow a prescribed path, collect the resulting measured data points, and then compare these measurements against a nominal surface shape. The nominal surface is typically described by an equation defining a planar, spherical, cylindrical, or aspheric surface. All of these surface shapes may be described by analytic equations which can then be fit to the data to determine the origin of the surface with respect to the measured surface points. Then, the resulting error of each surface point relative to the fit surface can be calculated. In this manner, profilometers can be used to determine whether a given actual surface deviates from a desired nominal surface, and by how much.

The precision of these surface measurements is limited by the precision of the motion of the profilometer and measurement mechanism(s) of the profilometer. Typically, the precision of a conventional profilometer is comparable to the precision of a conventional interferometer. As such, conventional profilometers and associated control systems are capable of measuring a single surface, performing the fit, and reporting the deviation from the surface with a high degree of fidelity. However, conventional profilometers can not adequately measure and analyze complex surfaces, for example, surfaces having multiple sub-features.

Nevertheless, complex article surfaces, for example, those comprising multiple sub-features, are of increasing practical interest in many fields of technology. For example, the telecommunications industry uses array(s) of microscopic lenses as component(s) of optical switching devices. Typically, these lens arrays are solid blocks of optical material and shaped with a repeated pattern of tiny lenses on the surface. The number of lenses in each array can vary from just a few to several hundred depending on the device. Successful performance of the optical switch requires each lens to have a proper optical shape and also be accurately positioned within the lens array. In order to improve product reliability and quality, surface properties, for example individual feature shape and relative position of one feature to another, need to be measured and analyzed during manufacturing. Unfortunately, this task is beyond the scope of current interferometry and profilometry measuring methods.

SUMMARY OF THE INVENTION

According to one aspect of the invention, a method of measuring an article comprises providing an article having a feature to be measured, the article having a surface; measuring the surface of the article with a measuring instrument to obtain article surface data; associating portions of the article surface data with individual features thereby producing associated feature surface data; and analyzing the associated feature surface data.

According to another aspect of the invention, a system for measuring an article having at least two individual features includes means for measuring a surface of the article to obtain article surface data; means for associating portions of the article surface data with the individual features thereby producing associated feature surface data; and means for analyzing the associated feature surface data.

According to another aspect of the invention, a method of measuring an article comprises providing an article having a feature to be measured, the article having a surface; measuring the surface of the article with a measuring instrument to obtain article surface data; and analyzing the article surface feature data such that data on the feature to be measured is developed.

According to another aspect of the invention, a computer storage medium having instructions stored therein for causing a computer to perform the methods described above is provided.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

As used herein, the term "surface" refers to an outer boundary (or any portion of the outer boundary) of an article that has a feature to be measured. This includes a top surface, a side surface, a bottom surface, or any portion(s) thereof.

As used herein, the term "array" refers to any arrangement of features, regular or irregular. Examples include, but are not limited to, a square or rectangular lattice, a closest-packed hexagonal pattern, one or more circular layouts, or a general arrangement of features in arbitrary defined locations.

As used herein, the term "measuring instrument" refers to devices that collect data based on contact measurement and/or interference fringe principles, such as a contact measuring instrument or an interference measuring instrument. Both types of devices measure points across a surface. A contact measuring instrument uses the principle of a probe contacting the surface. One example is a scanning profilometer, which collects (x, y, z) points by scanning a probe across the surface and recording points. A traditional profilometer may also be used, provided that the measures of interest may be adequately measured with a single trace along a line. An interference measuring instrument uses the principle of light interference to obtain measurements; various interferometric devices fall in this category when they include processors that determine points on the measured surface.

As used herein, a computer storage medium may comprise, for example, magnetic storage media such as a magnetic disk (for example, a floppy disk of any size) or magnetic tape; optical storage media such as an optical disk, optical tape, or machine readable bar code; solid state electronic storage devices such as random access memory (RAM), or read only memory (ROM); or any other physical device or medium employed to store a computer program or data.

Figure 1:
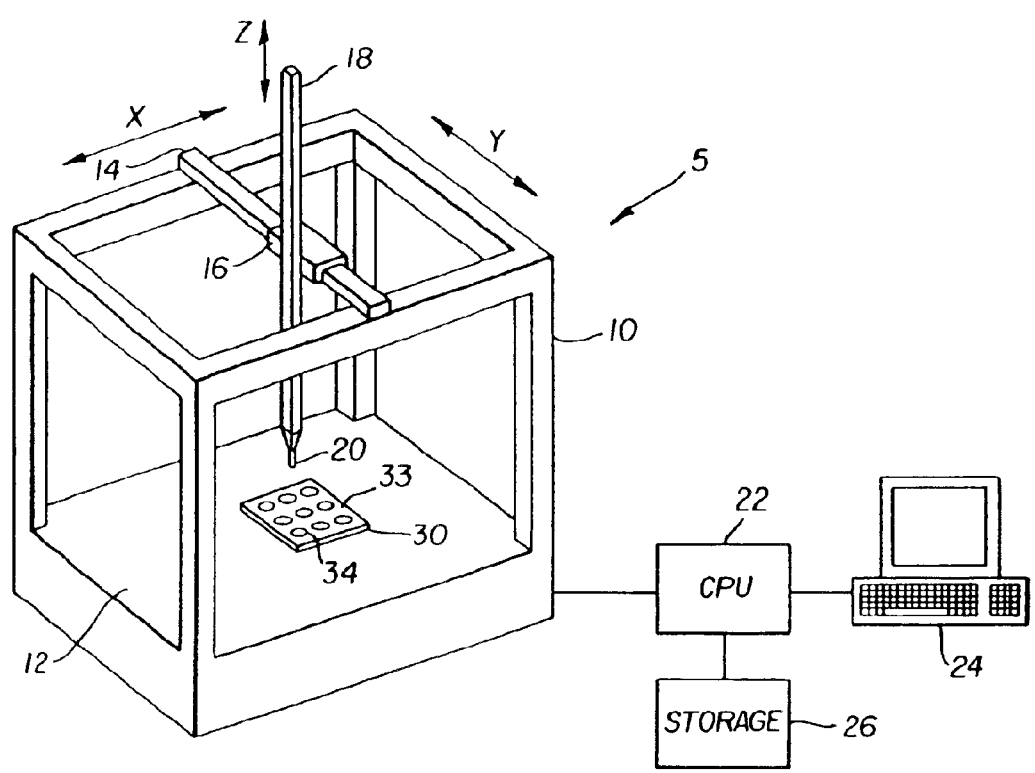
FIG. 1 is a schematic view of a measuring system made in accordance with the present invention.

Referring to FIG. 1, an article 30 has a surface 33 having at least one feature 34 is measured using a measuring instrument 5, for example a profilometer 10. The resulting measurement points of surface 33 are separated into regions corresponding to individual feature(s) 34. These measurement points are then analyzed individually to measure feature 34 shape deviations in operator defined locations. The measurement points are also used to determine best-fit feature 34 origins which are then used to measure feature 34 positions in a feature array 32 (shown in FIG. 2). The process can be iterated to improve the original data segmentation if desired.

This measurement apparatus and method can be used, for example, to measure arrays of lenses fabricated on an object and provide data on the shape of each individual lens as well as the position of each lens in the array. However, other types of article features can be measured with the apparatus and method described herein. The invention will now be described in more detail with reference to an embodiment using a scanning profilometer 10 as the measuring instrument 5.

Again referring to FIG. 1, measuring instrument 5, which in this embodiment is a scanning profilometer 10, includes a table 12 having an attached mechanism 14, 16, 18 with three motion axes: an x motion axis 14, a y motion axis 16, and a z motion axis 18. These three axes allow a probe 20 to be translated in arbitrary directions. A control computer 22 drives the axes to move the probe 20 in desired directions. The control computer 22 includes an operator interface 24 which allows an operator to command the measuring instrument 5 to perform various tasks.

The profilometer 10 measures an article 30 by placing the article 30 on the table 12 and moving the motion axes 14, 16, 18 until the probe 20 contacts the article 30. The control computer 22 then drives the x and y motion axes 14, 16 to move the probe 20 across the surface 33 of the article 30, while modulating the z axis 18 so that the probe 20 maintains contact with the article 30. At specific times during this motion, the control computer 22 records the position of all three motion axes, and stores the result in an electronic storage medium 26.

Figure 2:
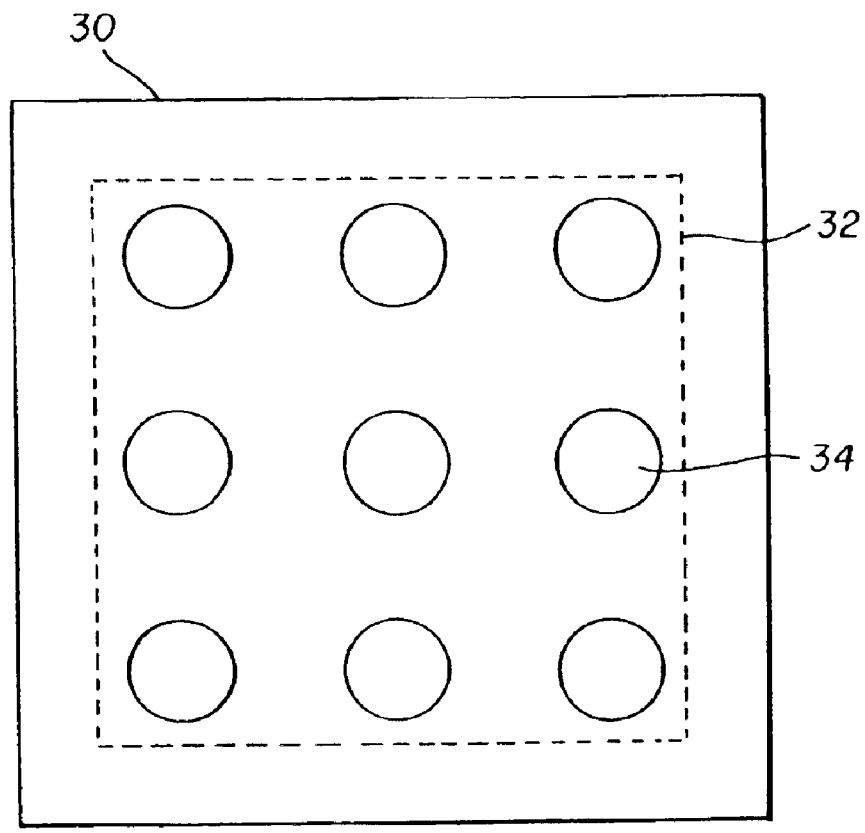
FIG. 2 is a top view of an article having features to be measured.
Figure 3:
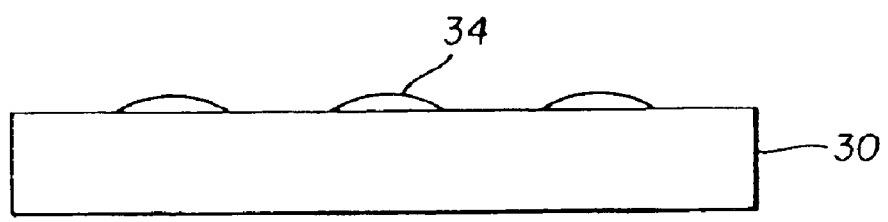
FIG. 3 is a side view of the article of FIG. 2.

Referring to FIGS. 2 and 3, an example article 30 to be measured by the scanning profilometer 10 is shown. The article 30 has an array 32 of features 34 to be measured. In this example, features 34 are small lenses, but other feature types can be measured using this invention. Additionally, the article 30 has a 3×3 rectangular array 32 of features 34, but other array configurations are possible, such as a 5×20 rectangular array 32, a 40×40 square array 32, a 10×1 linear array 32, etc. FIG. 3 shows a side view of the article 30.

Figure 4:
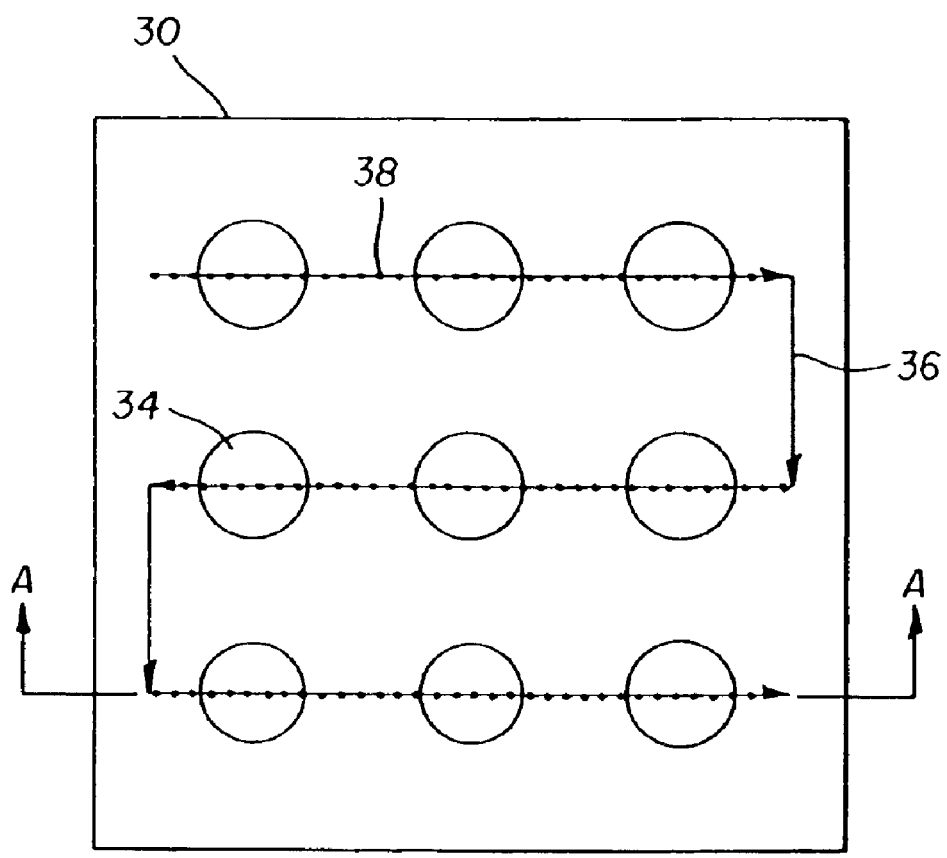
FIG. 4 is a top view of a x-raster scan path.
Figure 5:
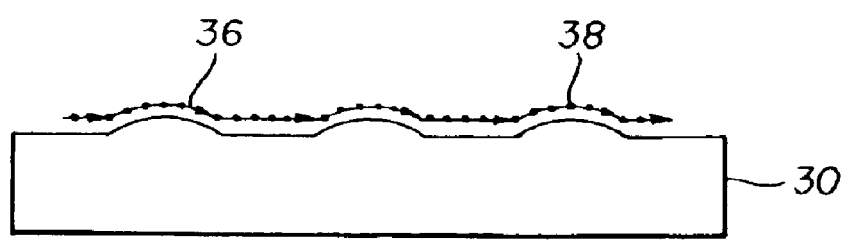
FIG. 5 is a side view of the x-raster scan path of FIG. 4 taken along section A—A.
Figure 6:
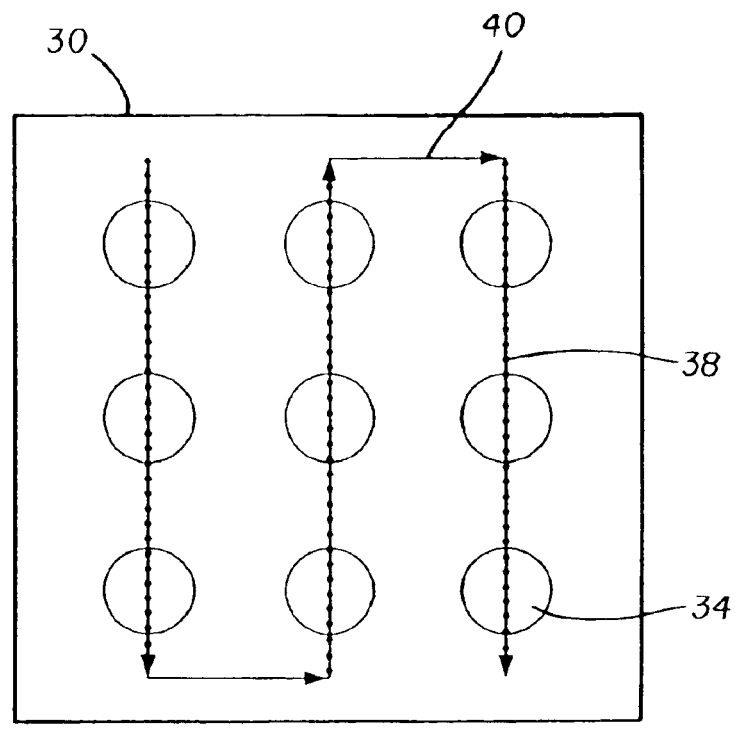
FIG. 6 is a top view of a y-raster scan path.
Figure 7:
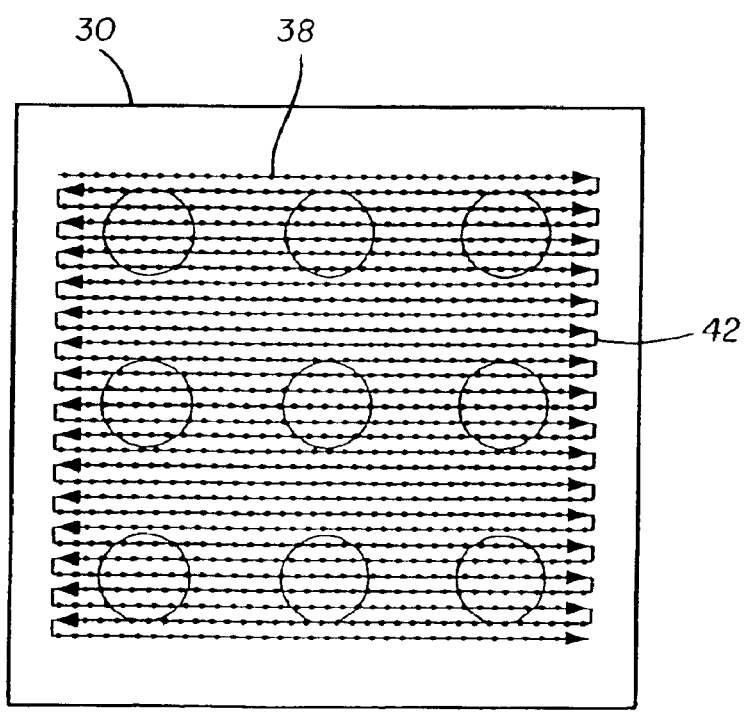
FIG. 7 is a top view of a fine x-raster scan path.

Referring to FIGS. 4–7, example profilometer scanning paths are shown. FIG. 4 shows an x-raster scan path 36, where the scan direction is parallel to the x axis and the step between scan lines is equal to the array 32 spacing. The dots indicate measurement points 38 where the profilometer position is recorded. FIG. 5 shows a side view of the path shown in FIG. 4. FIG. 6 shows a y-raster scan path 40, where the scan direction is parallel to they axis and the step between scan lines is equal to the array 32 spacing. FIG. 7 shows an x-raster scan path 42, with a finer step between scan lines. In FIGS. 4–7, the density of the measurement points 38 shown has been reduced for clarity.

Figure 8:
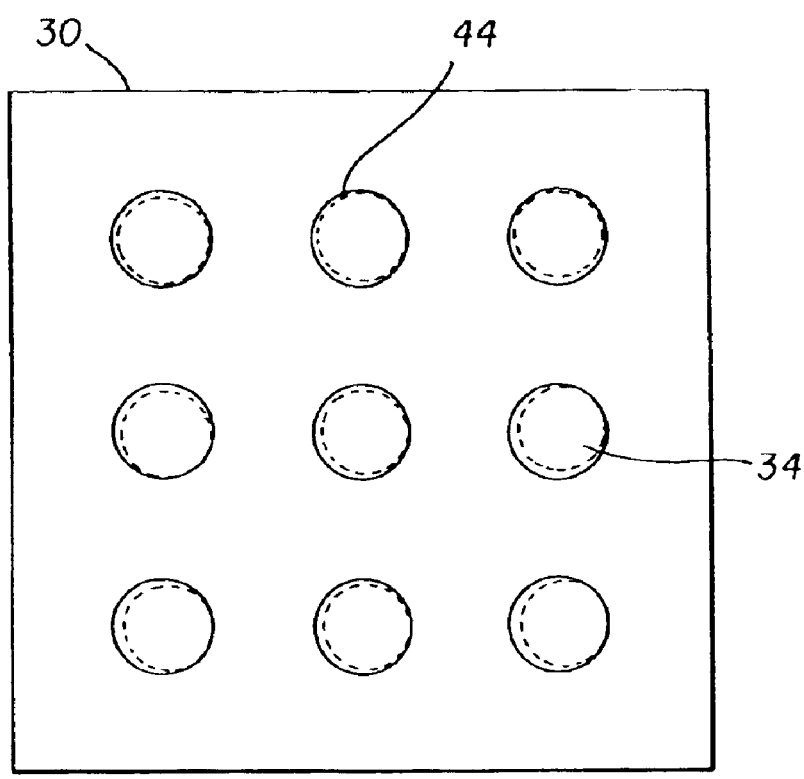
FIG. 8 is a top view of the expected locations of array features.

Referring to FIG. 8, once the measurement points 38 are recorded in the electronic storage medium 26, the next step in the method is to associate measurement points with individual array features. FIG. 8 shows the expected locations 44, as defined by an operator, of features 34 of the article 30. In this embodiment, the expected locations 44 have been made these slightly smaller than the features 34 to allow for slight errors in the initial estimate of article position. These errors can cause a slight misalignment between the location of the expected locations 44 and the actual features 34. These errors are discovered and corrected by the method of the invention.

Figure 9:
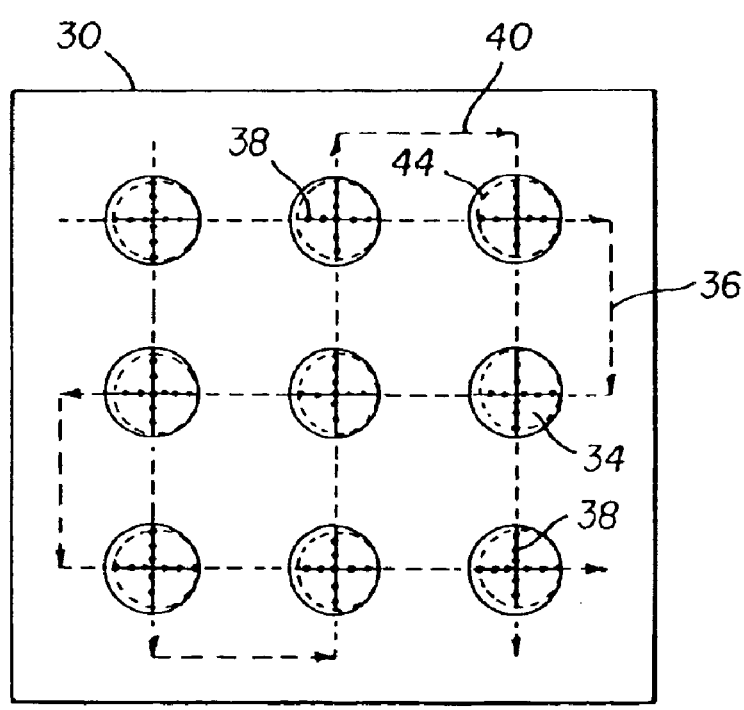
FIG. 9 is top view of the measurement points associated with each expected location for the scans of FIGS. 4–6.

The control computer 22 identifies measurement points 38, collected during a single or multiple scan, that fall within the expected locations 44. Referring to FIG. 9, the control computer 22 then associates the measurement points 38 from scan paths 36 and 40, for example, with the expected locations 44 of features 34. The scan paths 36 and 40 are shown in dashed lines for reference. Within each expected location 44, scan path 36 and 40 segments and associated measurement points 38 are similar to the "cross hair" scan paths employed by conventional scanning profilometer methods. However, the present invention obtains these data points by executing only two scans, instead of the many scans required using conventional scanning profilometer methods.

Figure 10:
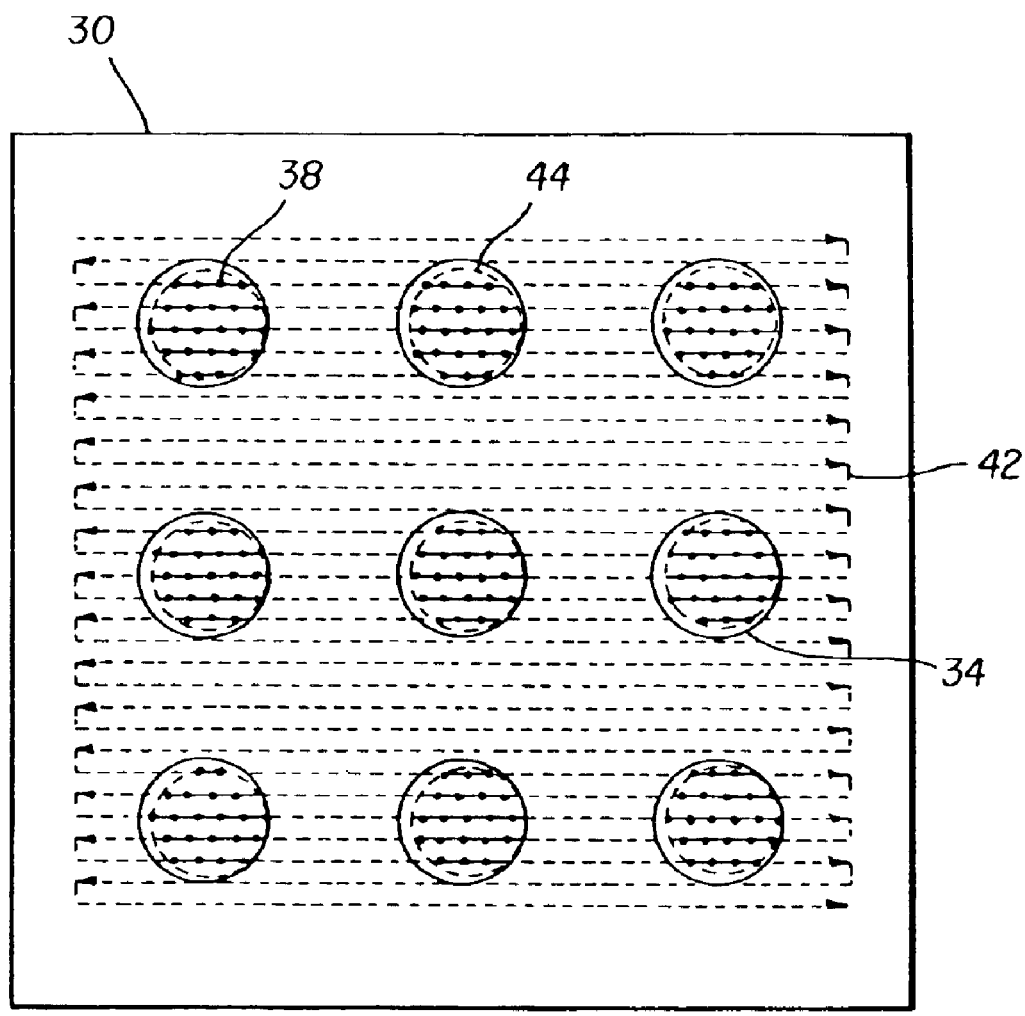
FIG. 10 is a top view of the measurement points associated with each expected location for the scan of FIG. 7.

Referring to FIG. 10, a second example is shown. In FIG. 10, measurement points 38 from the fine x-raster scan 42 are associated with expected feature locations 44. In this example, multiple scan lines overlap each expected location 44. In this respect, the points 38 within each location 44 are similar to the x-raster scan paths employed by conventional scanning profilometer methods when measuring a single surface. However, the present invention obtains these results using a single scan, instead of the many scans that would be required using a conventional scanning profilometer.

Figure 11A:
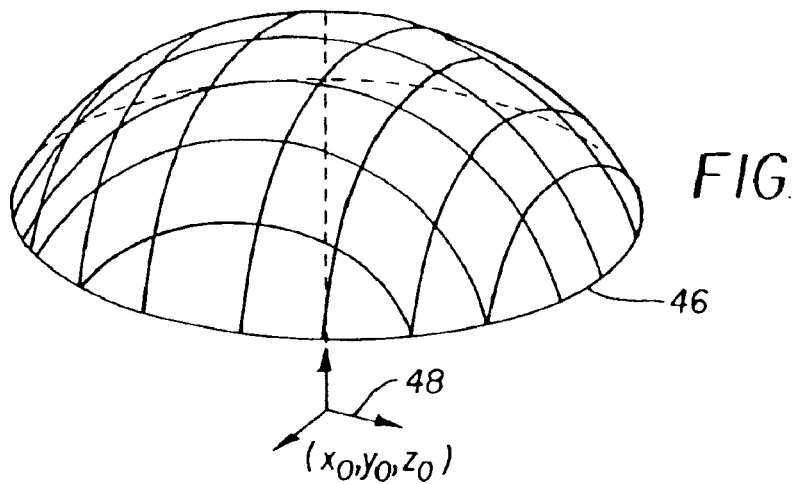
FIG. 11a is the nominal surface.
Figure 11B:
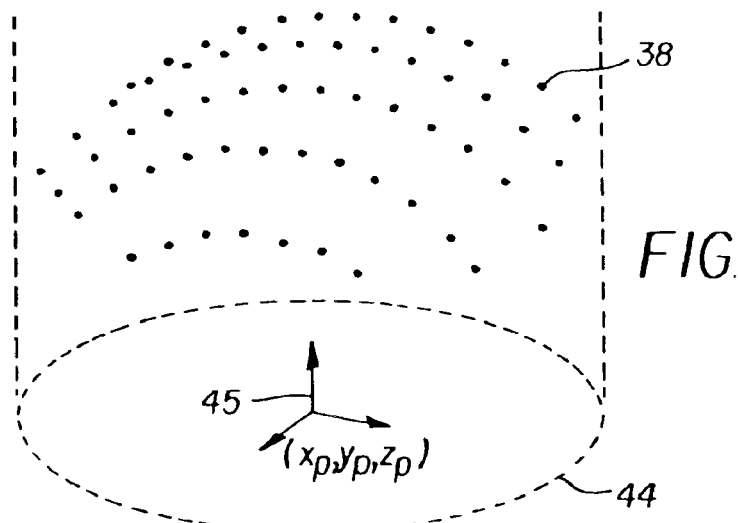
FIG. 11b is the measurement points for an expected location.
Figure 11C:
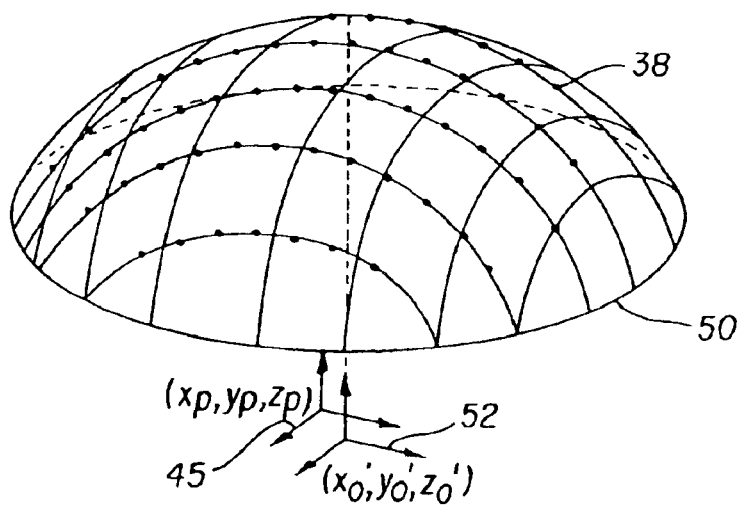
FIG. 11c is the nominal surface shown in the position that minimizes the error of the measurement points.

Referring to FIGS. 11a–11c, next, the control computer 22 analyzes each expected location 44 as a separate surface-fitting problem. An operator inputs a description of a nominal surface 46 at the operator interface 24 (shown in FIG. 1). The control computer 22 compares the nominal surface 46 to the measurement points 38 within the expected location 44. FIG. 11a shows the nominal surface 46 with origin ($x_o$, $y_o$, $z_o$) 48. FIG. 11b shows the measured points 38 within the expected location 44, expressed with respect to a local origin ($x_p$, $y_p$, $z_p$) 45. The control computer 22 evaluates various transformations of the nominal surface 46 relative to the measurement points 38, until the transformation is found that minimizes the error between the measurement points and transformed nominal surface 50, shown in FIG. 11c. The transformations evaluated by the control computer 22 may be pure translations, as shown in FIGS. 11a–11c, or an arbitrary combination of translations and rotations. An origin 52 ($x_o'$, $y_o'$, $z_o'$) of the transformed nominal surface 50 is then developed by the control computer 22. Typically, the transformed origin 52 is found by fitting the nominal surface 46 to the measurement points 38, not by taking the center of the expected location region 44.

The control computer 22 then compares the measurement points 38 with the transformed nominal surface 50 to compute the error in the feature surface. A variety of error metrics can be computed, such as root-mean-squared error, peak-to-valley error, etc. This process is repeated for each expected location 44, and the results are output to the operator interface 24 and stored in the electronic storage medium 26 for future reference. In this way the method measures and reports surface error for each individual feature 34.

Figure 12A:
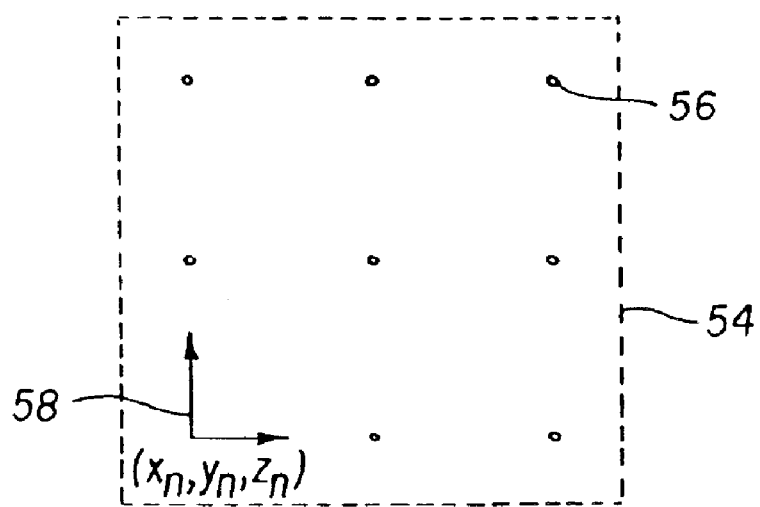
FIG. 12a is the nominal array.
Figure 12B:
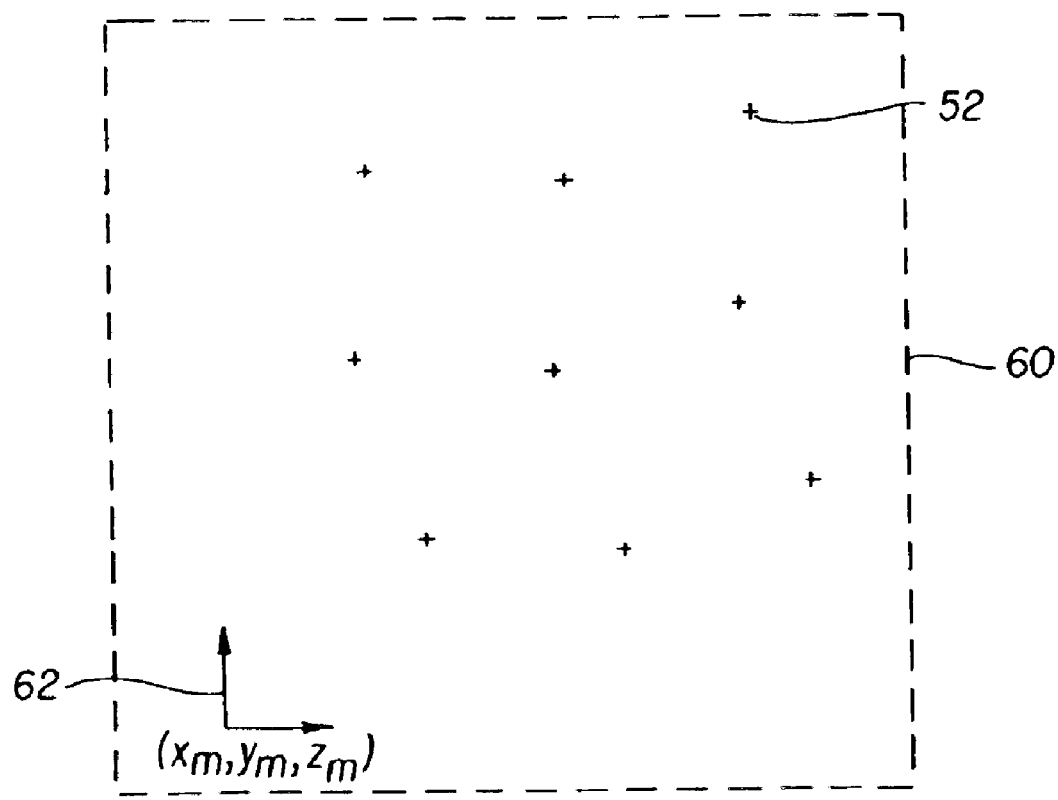
FIG. 12b is the set of transformed origins.
Figure 12C:
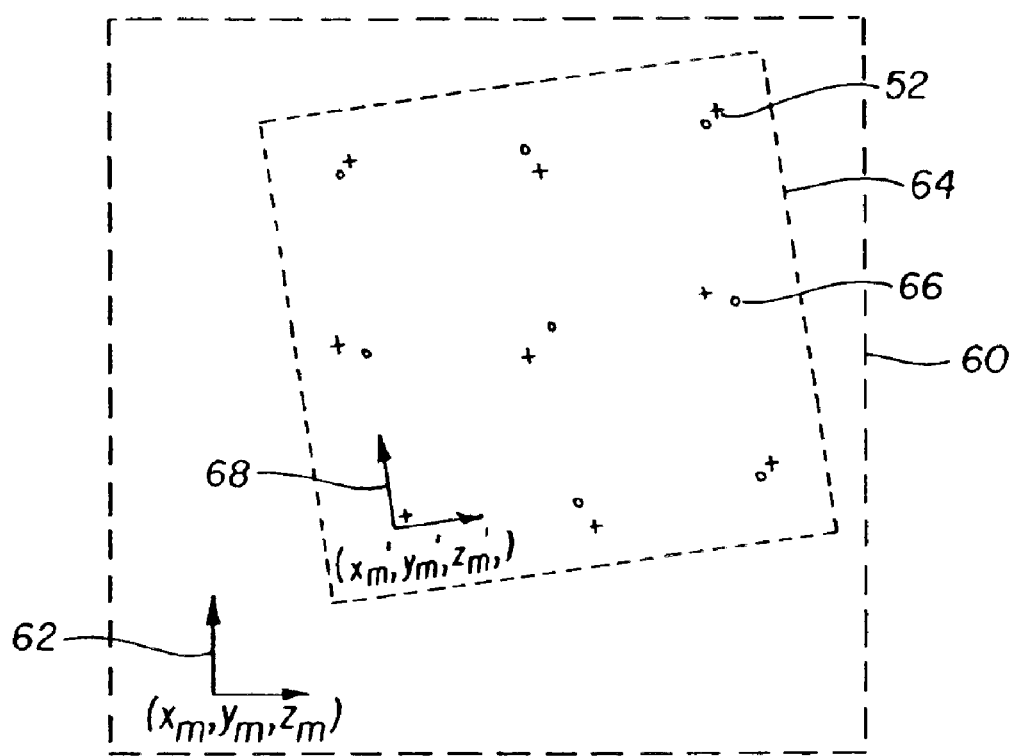
FIG. 12c is the nominal array shown in the position that minimizes the error of the transformed origins.

Referring to FIGS. 12a and 12b, the control computer 22 then analyzes the transformed origins 52 to measure the positions of the features 34 in the array 32. The operator inputs a description of the nominal array 54, typically, comprised of nominal points 56 at the operator interface 24. The nominal array 54 has an origin ($x_n$, $y_n$, $z_n$) 58 and is shown in FIG. 12a. In addition, the ensemble of transformed origins 52, described above, define a measured array 60 with origin ($x_m$, $y_m$, $z_m$) 62, shown in FIG. 12b. The control computer 22 evaluates various transformations of the nominal array 54 relative to the measured array 60, until the transformation is found which minimizes the error between the measured and transformed arrays, shown in FIG. 12c. Typically, the transformations considered include all rotations and translations, but it is possible to either exclude some of these degrees of freedom, or add others such as skew. The minimized error is a metric on the distance between corresponding measured and nominal array points, such as the root-mean-squared error. In this way, the control computer 22 identifies the best-fit position of the nominal array 54 relative to the measured array locations 60. The transformed nominal array 64 having origin 68 ($x_m'$, $y_m'$, $z_m'$) is comprised of transformed nominal points 66. In FIG. 12c, the distance between the nominal origin 58, shown in FIG. 12a, and the transformed nominal origin 68 is shown exaggerated for clarity.

The control computer 22 then calculates various error statistics about the feature array 32, such as the maximum distance between a measured point and its corresponding nominal point, the root-mean-squared distance between nominal and measured points, a list of vectors describing the nominal-to-measured point deviations for every array feature, etc. These results are output to the operator interface 24 and stored in the electronic storage 26. In this way, the method measures and reports array location errors for every array feature, as well as location error statistics for the entire array 32.

At this stage, the control computer 22 has computed the best-fit position relationship between the nominal array 54 and the measured array 60. The expected locations 44, shown in FIG. 8, were predicted based on the assumption that the nominal array origin 58 was an accurate description of the array location. Now, the control computer 22 has information indicating that the transformed nominal origin 68 is the correct location. At this point, in some embodiments of the invention, the control computer 22 uses the transformed nominal origin 68 to re-compute the expected locations 44, after which the above process is repeated. This can provide in some cases an improved classification of measured points, thereby improving the quality of all the output measurements. This iterative process can be repeated multiple times until the transformed array origin location converges, under some convergence criterion.

Figure 13:
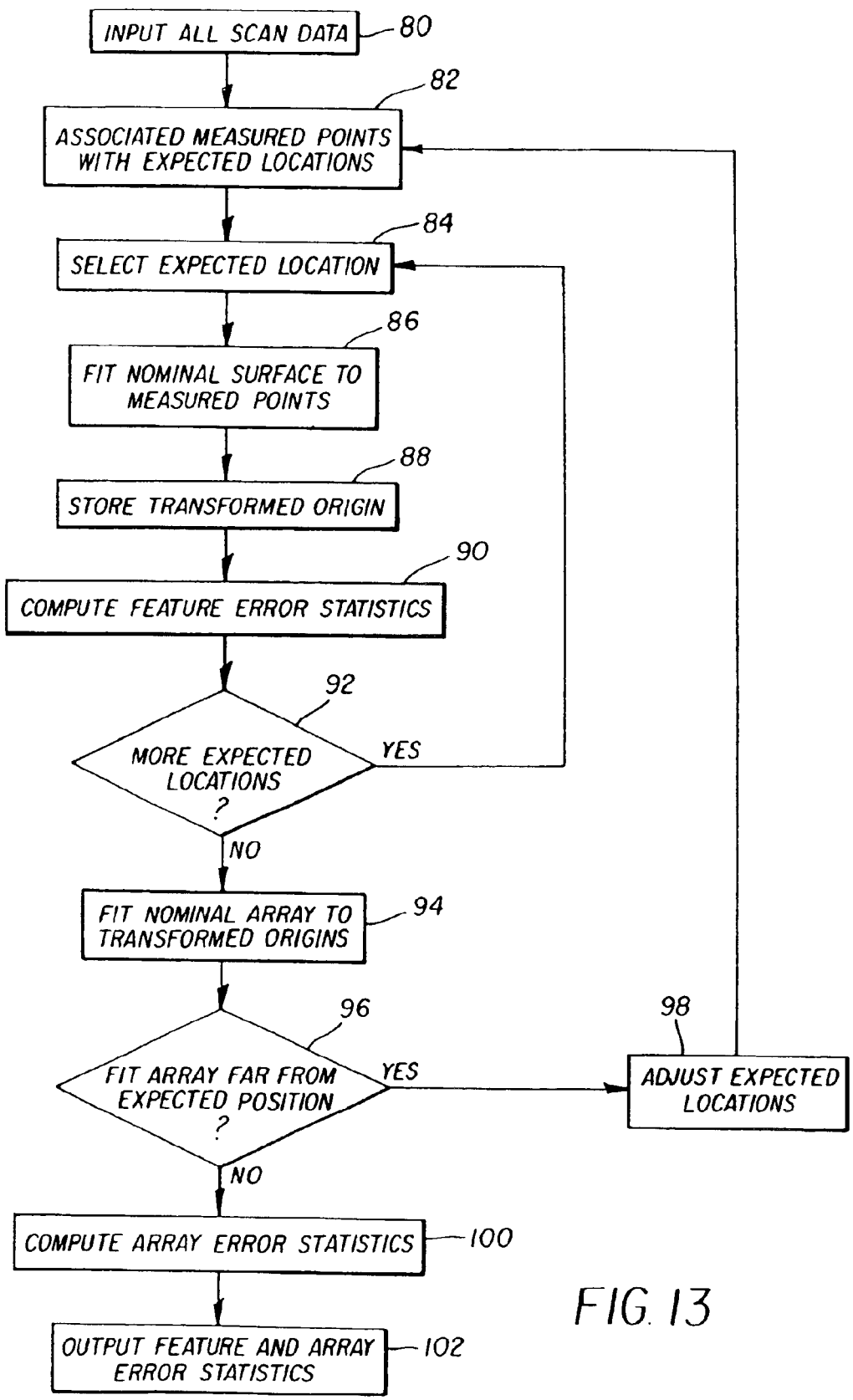
FIG. 13 is a flowchart of the method.

Referring to FIG. 13, a flowchart summarizing the method of the present invention described above is shown. Scan data, including measurement points 38 generated by the measuring instrument 5 is stored in control computer 22 (step 80). The measurement points 38 are associated with expected locations 44 by the control computer 22 (step 82). An expected location 44 is chosen for analysis (step 84). A nominal surface 46 is fitted with the measured points 38 by the computer 22 (step 86). A transformed origin 48 is developed and stored by the computer 22 (step 88). Feature 34 error statistics are calculated by the computer 22 for the feature 34 associated with the expected location 44 being analyzed (step 90). If additional expected locations 44 are present and it is desired to analyze any of these additional locations 44, the process is repeated beginning with step 84. If the analysis of expected location(s) 44 is complete, the process continues with step 94. A nominal array 54 is fitted to the transformed origin(s) 48 developed above by the computer 22 (step 94). If the fitted array 64 is located too far away from its expected location (based on criteria and information stored in the computer), the expected locations 44 of the feature 34 is adjusted (step 98) and the process begins again from step 82. If the fitted array 64 is located close to its expected position, the process continues with step 100. The computer calculates array error statistics (step 100). The feature 34 and array 32 error statistics are output (step 102).

The above description has shown how the method of the present invention can measure feature 34 shape and location in an array 32 for rectilinear arrays using either a pair of scans such as 36, 40 or a single scan 42. These specific examples illustrate how x- and y-raster scans can be used to scan rectilinear arrays. This is a convenient example, because rectilinear arrays are frequently of interest and x- and y-raster scans are common scan operations included on scanning profilometers. However, the present invention is by no means limited to these specific examples. Arbitrary array geometries and arbitrary scan paths fall within the scope of the invention, since all such cases can be expressed as expected location 44 regions and the control computer 22 can be programmed to associate measured points 38 from any scan path to its corresponding expected location 44 region. Likewise, the measured points 38 from an arbitrary number of scans (not just one or two scans as described above) can be simultaneously considered by the method of the invention.

Figure 14A:
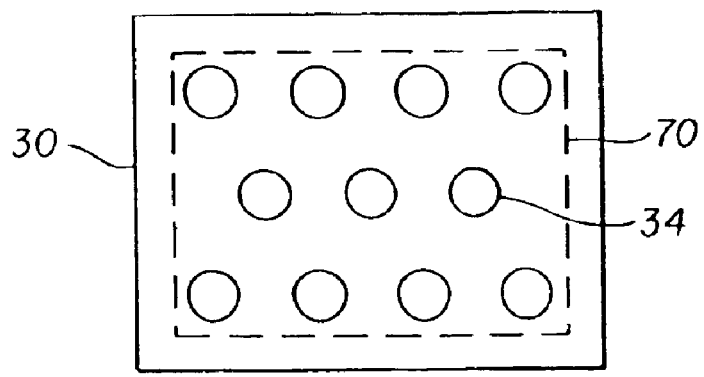
FIG. 14a is a top view of a closest-packed array.
Figure 14B:
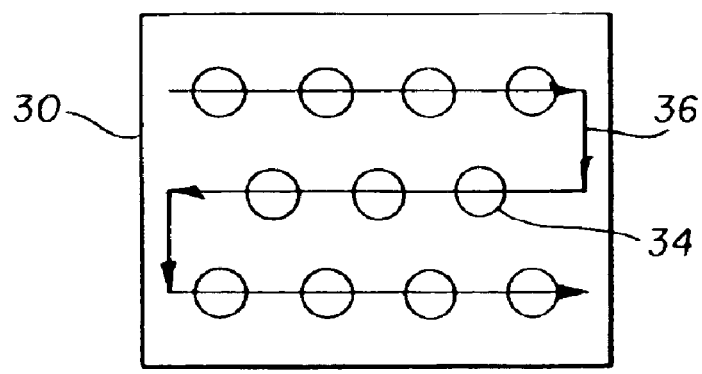
FIG. 14b is an x-raster scan of a closest-packed array.
Figure 14C:
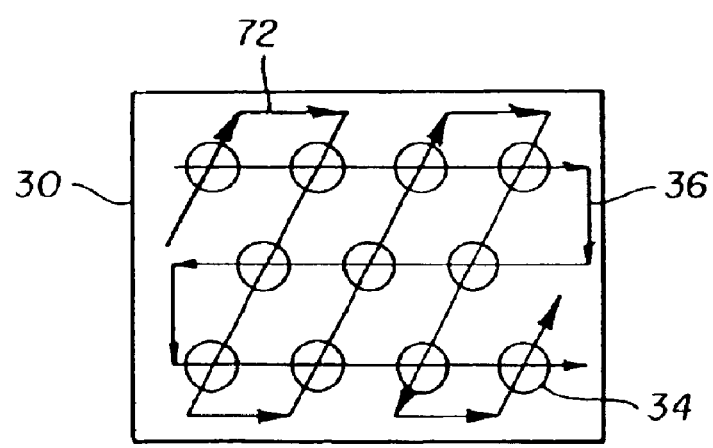
FIG. 14c is a slanted raster scan of a closest-packed array.

Referring to FIGS. 14a–14c, additional examples of array 32 geometries and scan paths are shown. In FIG. 14a, the article 30 has an array of features 34 (for example, lenses) arranged in a closest-packed pattern 70. The first scan used to measure this array is an x-raster scan 36, shown in FIG. 14b. The second scan is a slanted raster scan 72, shown in FIG. 14c. The measured points 38 for these scans are omitted for clarity. The measured points 38 from both scans 36, 72 are then combined and associated with expected locations 44, producing a set of location regions which have data points similar to the "cross hair" scans described above, but with a skew angle. The remainder of the analysis proceeds in the manner described above.

Figure 15A:
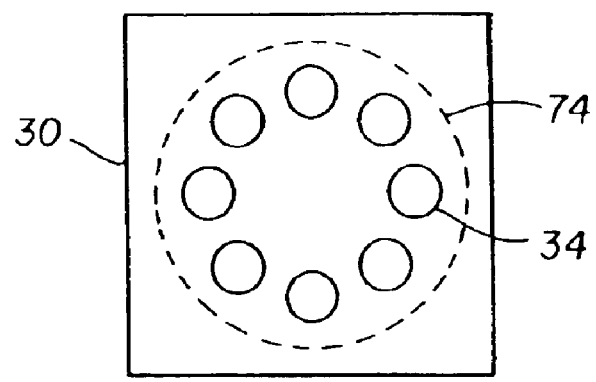
FIG. 15a is a top view of a circular array.
Figure 15B:
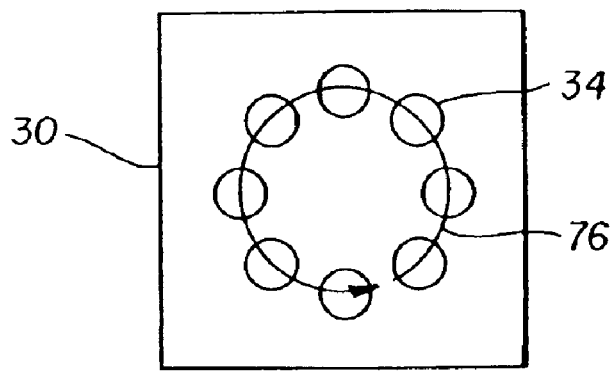
FIG. 15b is a circular scan of a circular array.
Figure 15C:
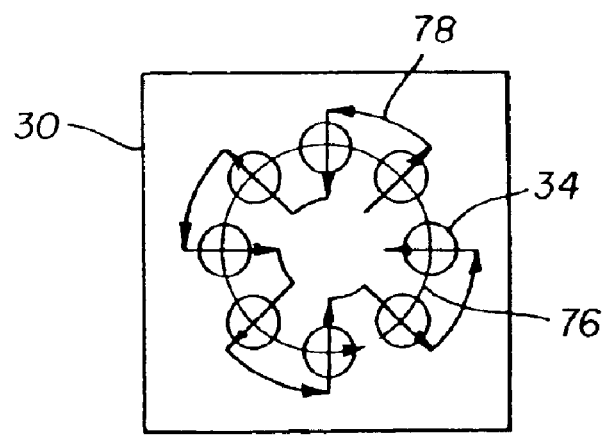
FIG. 15c is a radial-spoke scan of a circular array.

Referring to FIGS. 15a–15c, additional examples of array 32 geometries and scan paths are shown. In FIG. 15a, the article 30 has an array 32 of features (for example, lenses) arranged in a circular pattern 74. The first scan is a circular scan 76, shown in FIG. 15b. The second scan is a radial-spoke scan 78, shown in FIG. 15c. The measured points 38 for these scans are omitted for clarity. The measured points 38 from scans 76, 78 are then combined and associated with expected locations 44, again producing a set of location regions which have data points similar to the "cross hair" scans for each feature 34, this time with a slight curve to one of the scans. Once again, the remainder of the analysis proceeds as described above.

Finally, it should be understood that the present invention does not require a profilometer with x, y, and z axes as shown in FIG. 1. Other measuring instrument configurations are possible, such as machines that use rotational motion axes instead of linear motion axes for some or all of their degrees of freedom. These devices might take fundamental measurements in polar, cylindrical, or spherical coordinate systems. In these situations, the above described data analysis methods can be implemented in terms of the native coordinate systems for these machines. Alternatively, the measured coordinates can be converted to (x, y, z) Cartesian coordinates with the above described analysis proceeding as described above.

The invention has been described in detail with particular reference to certain preferred embodiments thereof, but it will be understood that variations and modifications can be effected within the scope of the invention.

PARTS LIST 5 measuring instrument
10 profilometer
12 table
14 x motion axis
16 y motion axis
18 z motion axis
20 probe
22 control computer
24 operator interface
26 electronic storage
30 part
32 array
33 surface
34 feature
36 x-raster scan path
38 measurement point
40 y-raster scan path
42 x-raster scan path
44 expected location
45 origin
46 nominal surface
48 origin
50 transformed nominal surface
52 origin
54 nominal array
56 nominal point
58 origin
60 measured array
62 origin
64 transformed nominal array
66 transformed nominal point
68 origin
70 closest-packed pattern
72 slanted raster scan
74 circular pattern
76 circular scan
78 radial-spoke scan

What is claimed is:

1. A method of measuring an article comprising:

providing an article having a feature to be measured, the article having a surface;

measuring the surface of the article with a measuring instrument to obtain article surface data;

associating portions of the article surface data with individual features thereby producing associated feature surface data; and analyzing the associated feature surface data, wherein measuring the surface of the article includes scanning the measuring instrument over the article surface in a first direction.

2. The method according to claim 1, wherein the measuring instrument is a contact measuring instrument.

3. The method according to claim 1, wherein scanning the measuring instrument over the article surface includes scanning in a second direction, the second direction being different from the first direction.

4. The method according to claim 1, wherein scanning the measuring instrument over the article surface includes making more than one pass over the article surface in a first direction.

5. The method according to claim 1, wherein the article has a plurality of features.

6. A computer storage medium having instructions stored therein for causing a computer to perform the method of claim 1.

7. The method according to claim 1, wherein the measuring instrument is an interference measuring instrument.

8. A method of measuring an article comprising:
providing an article having a feature to be measured, the article having a surface;
measuring the surface of the article with a measuring instrument to obtain article surface data;
associating portions of the article surface data with individual features thereby producing associated feature surface data; and
analyzing the associated feature surface data, wherein associating portions of the article surface data with individual features comprises:
providing data on an expected location of the feature; and
identifying article surface data that falls within the expected location of the feature to produce the associated feature surface data.

9. The method according to claim 8, wherein analyzing the associated feature surface data comprises:
providing nominal feature surface shape data; and
comparing the nominal feature surface shape data with the associated feature surface data.

10. The method according to claim 9, wherein analyzing the associated feature surface data comprises:
transforming the nominal feature surface shape data such that best-fit nominal feature surface shape data is developed.

11. The method according to claim 10, wherein analyzing the associated feature surface data comprises:
calculating a feature surface error by comparing the transformed nominal feature surface shape data with the associated feature surface data.

12. A method of measuring an article comprising:
providing an article having a feature to be measured, the article having a surface;
measuring the surface of the article with a measuring instrument to obtain article surface data;
associating portions of the article surface data with individual features thereby producing associated feature surface data; and
analyzing the associated feature surface data, wherein analyzing the associated feature surface data comprises:
providing nominal feature surface shape data; and
comparing the nominal feature surface shape data with the associated feature surface data.

13. The method according to claim 12, wherein analyzing the associated feature surface data comprises:
transforming the nominal feature surface shape data such that best-fit nominal feature surface shape data is developed.

14. The method according to claim 13, wherein analyzing the associated feature surface data comprises:
calculating a feature surface error by comparing the transformed nominal feature surface shape data with the associated feature surface data.

15. The method according to claim 12, further comprising:
transforming the nominal feature surface shape data such that best-fit nominal feature surface shape data is developed; and
fitting the transformed nominal feature surface shape data to the associated feature surface data such that measured feature origin data is developed.

16. The method according to claim 15, further comprising:
providing nominal feature arrangement data; and
comparing the nominal feature arrangement data with the measured feature origin data.

17. The method according to claim 16, further comprising:
transforming the nominal feature arrangement data and comparing the nominal feature arrangement data with the measured feature origin data such that best-fit nominal feature arrangement data is developed.

18. The method according to claim 17, further comprising calculating a feature arrangement error by comparing the best-fit nominal feature arrangement data with the measured feature origin data.

19. A system for measuring an article having at least two individual features comprising:
means for measuring a surface of the article to obtain article surface data;
means for associating portions of the article surface data with the individual features thereby producing associated feature surface data; and
means for analyzing the associated feature surface data, wherein the means for measuring a measuring the surface of the article includes an interference measuring instrument.

20. The system according to claim 19, wherein the means for measuring the surface of the article includes means for scanning a measuring instrument over the article surface.

21. The system according to claim 19, wherein the interference measuring instrument uses light.

22. The system according to claim 19, wherein the means for associating portions of the article surface data with the individual features thereby producing associated feature surface data includes a computer.

23. The system according to claim 19, wherein the means for analyzing the associated feature surface data includes a computer.

24. The system according to claim 19, wherein the means for associating portions of the article surface data with the individual features thereby producing associated feature surface data includes a computer program.

25. The system according to claim 19, wherein the means for analyzing the associated feature surface data includes a computer program.

26. A system for measuring an article having at least two individual features comprising:
means for measuring a surface of the article to obtain article surface data;
means for associating portions of the article surface data with the individual features thereby producing associated feature surface data; and means for analyzing the associated feature surface data, wherein the means for measuring the surface of the article includes a contact measuring instrument, the contact measuring instrument being of a type that is physically contactable with the article.

27. A method of measuring an article comprising:

providing an article having a feature to be measured, the article having a surface;

measuring the surface of the article with a measuring instrument to obtain article surface data; and analyzing the article surface feature data such that data on the feature to be measured is developed, wherein measuring the surface of the article includes scanning the measuring instrument over the article surface in a first direction.

28. The method according to claim 27, wherein the measuring instrument is a contact measuring instrument.

29. The method according to claim 27, wherein scanning the measuring instrument over the article surface includes scanning in a second direction, the second direction being different from the first direction.

30. The method according to claim 27, wherein scanning the measuring instrument over the article surface includes making more than one pass over the article surface in the first direction.

31. The method according to claim 27, wherein the article has a plurality of features.

32. The method according to claim 27, wherein measuring the surface of the article includes using an interference measuring instrument.

33. The method according to claim 27, wherein analyzing the article surface feature data comprises:

associating portions of the article surface data with individual features thereby producing associated feature surface data; and analyzing the associated feature surface data.

34. The method according to claim 27, wherein the measuring instrument is an interference measuring instrument.

* * * * *